Feb. 21, 1961    E. D. VISSING    2,972,190
LENS COVER
Filed Aug. 25, 1958    2 Sheets-Sheet 1
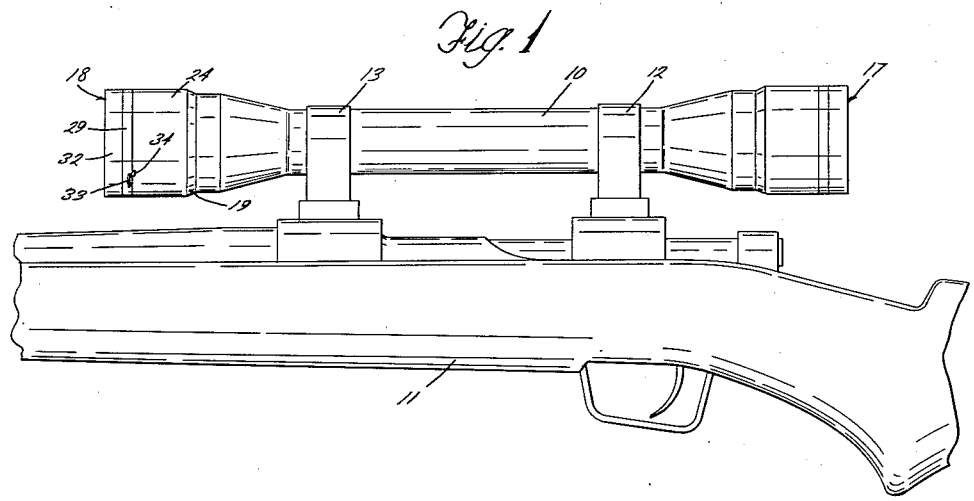
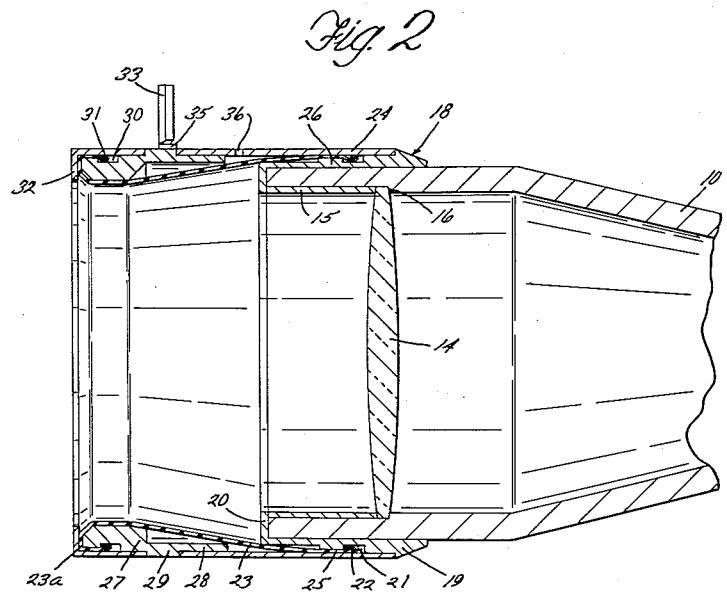
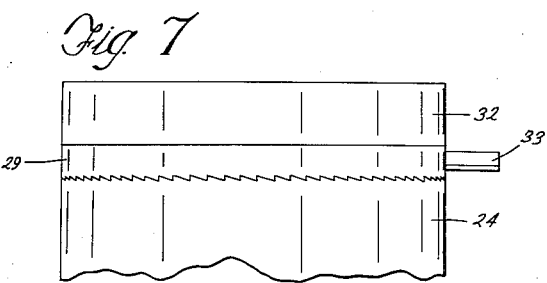
INVENTOR.
Ellinn D. Vissing
BY
Truhwells
Atty.

Feb. 21, 1961  E. D. VISSING  2,972,190
LENS COVER
Filed Aug. 25, 1958  2 Sheets-Sheet 2
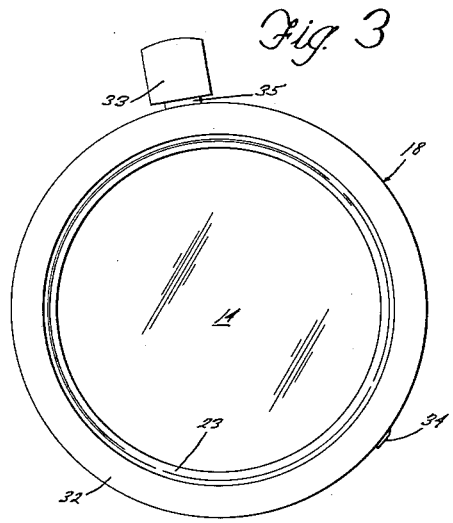
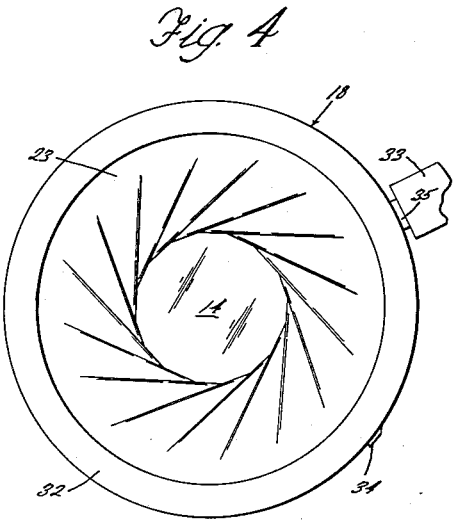
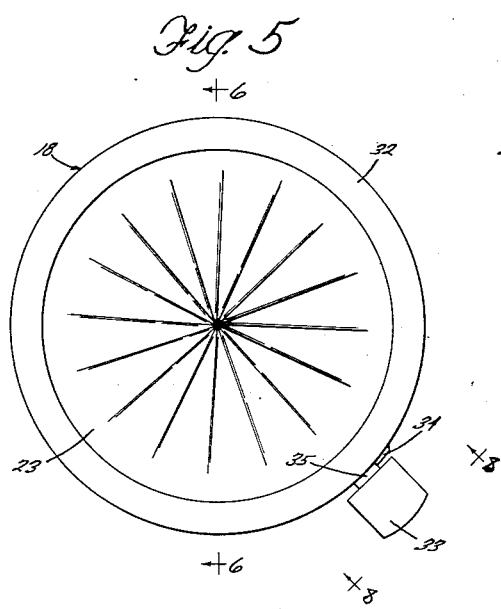
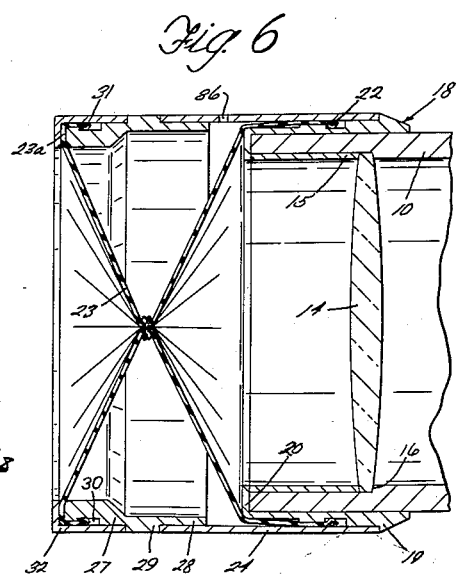
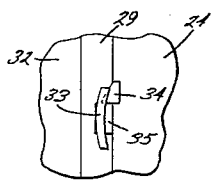
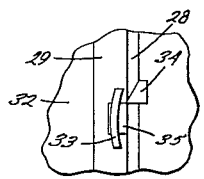
INVENTOR.
Ellinn D. Vissing
BY
Atty.

2,972,190
LENS COVER

Ellinn D. Vissing, Idaho Falls, Idaho

Filed Aug. 25, 1958, Ser. No. 756,794

9 Claims. (Cl. 33—50)

My invention relates to closures for openings such as the openings at the ends of a telescope. In particular it relates to closures for the ends of a telescopic sight for guns, whereby to protect the lenses of the device from moisture, dirt and the like.

In the use of telescopic sights on hunting rifles it is highly essential to provide some means to protect the lenses of the telescope. Many lens covers have been produced for this purpose. My present invention is designed to provide the essential cover or seal for the lenses which, when closed, will keep out moisture, dirt and other foreign material and which, when open, will provide a smooth unobstructed passageway to the lens that does not have pockets to trap the foreign material that may enter while it is open.

More specifically, it is the purpose of my invention to provide a lens cover for the lenses of a telescope comprising a tube of flexible, resilient material with attachment means at one end for securing it to the casing of the telescope and a ring fixed to the other end of the tube, rotatably mounted to the casing, whereby the tube may be twisted between its attachment to the ring and its attachment to the casing to effect a closure. The closure may be maintained by any suitable latching means that will overcome the tendency of the resilient tube to untwist itself.

The nature and advantages of my invention will appear more fully from the following description and the accompanying drawings illustrating my invention in its preferred form. It should be understood, however, that the drawings and description are illustrative only and that changes may be made from the details shown and described within the scope of the claims.

In the drawings:

Figure 1 is a view in side elevation of a portion of a rifle equipped with a telescope sight to which my invention is applied;

Figure 2 is an enlarged sectional view taken through one end of the telescope on a plane including the axis of the telescope;

Figure 3 is an end view looking at Figure 2 from the left end;

Figure 4 is a view like Figure 3, with the closure partially closed;

Figure 5 is a view like Figure 3 with the closure completely closed;

Figure 6 is a sectional view taken on the line 6—6 of Figure 5;

Figure 7 is a side view showing a modification;

Figures 8 and 9 are fragmentary detail views looking at Figure 5 from the line 8—8, illustrating how the cover is released for opening.

My invention is shown as applied to the telescope sight 10 of a rifle 11. The telescope sight 10 is mounted on the rifle by any conventional means such as the two supports 12 and 13. The telescope sight has lenses 14 therein, one of which is shown in Figure 2. The surfaces of the lenses 14 exposed at the ends of the telescope 10 are the parts of the optical system that must be protected. The lens 14 is secured in place by a ring 15 which holds the lens against a shoulder 16 provided on the interior of the shell of the telescope 10.

The closure unit embodying my invention is applied to both ends of the telescope 10 as indicated at 17 and 18. Since these closures are alike, only the unit 18 is shown in detail and a description of this unit 18 will suffice for both. The closure unit 18 comprises a sleeve 19 that is secured by press fit or otherwise over the end of the telescope 10. The sleeve 19 has a flange 20 that extends inward and covers the end of the ring 15. The sleeve 19 has a peripheral channel 21 therein. This channel receives a clamp ring 22 which clamps one open end of a flexible, elastic tube 23 in the channel 21.

The flexible, elastic tube 23 is the element which closes the end of the telescope 10 to keep out foreign material. It may be made of any suitable material that is flexible and elastic to a sufficient degree to enable it to close in the manner to be hereinafter described. A tube of latex, or natural rubber, has the necessary elasticity or resilience. Also synthetic rubber products such as neoprene, may be made with the necessary elasticity and flexibility to serve my purpose. This tube 23 is on the outside of the sleeve 19. To further secure the tube 23 and protect it, I provide a band 24 which clamps the tube 23 lightly at 25 against an annular rib 26 bordering the channel 21. The band 24 is pressed on the sleeve 19 so as to be secure against turning thereon, but it can be removed for replacement of the tube 23.

The band 24 projects endwise of the telescope 10 beyond the flange 20 a substantial distance. A cylindrical shell 27 has a portion 28 telescoped into the band 24 until the edge of the band 24 is stopped by an annular rib 29 on the shell 27. The tube 23 extends through the shell 27 and is turned outward over the shell 27. The out turned portion 23a of the tube 23 is secured in a channel 30 of the shell 27 by a clamp ring 31. An open centered cap 32 fits over the out turned tube portion 23a and completes the assembly.

Closure of the tube 23 across the opening to the lens 14 is accomplished by turning the shell 27 with respect to the sleeve 19 and the band 24. Figures 4 to 6 of the drawings illustrate how this causes the tube 23 to close by forming overlapping folds in the walls thereof as one end of the tube 23 is rotated about the tube axis with respect to the other end. It takes less than 180 degrees of rotation of the shell 27 in the band 24 to effect a closure as illustrated in Figure 6 of the drawings. The tube 23 is preferably under slight tension between its line of attachment to the shell 27 and its line of attachment to the sleeve 19. The twisting of the tube 23 increases the tension therein and stretches the material of the tube to the final shape illustrated in Figures 5 and 6. The tube 23 naturally will tend to return to the position shown in Figure 2 of the drawings and this return movement is opposed by the frictional engagement between the band 24 and the shell 27. To keep the tube 23 closed, I provide the latching means shown best by Figures 7 to 9 of the drawings. The rib 29 carries a finger piece 33. In the form of latching means shown in Figure 7, the meeting edges of the rib 29 and the band 24 are serrated so that when the serrations on the rib 29 mesh with those on the band 24, they oppose turning of the shell 27 in the band 24. By moving the rib 29 axially away from the band 24, the serrations are separated so that the shell 27 can be rotated with respect to the band. In the form shown in Figures 8 and 9 the band 24 has a lug 34 thereon providing a catch to engage the stem 35 of the finger piece as illustrated in Figure 8. To release the tube 23 for closing, the shell 27 and the finger piece 33 are moved axially of the band 24 until the catch 34 is cleared. Other suitable latch means may, of course, be provided.

It is apparent that my invention is not limited to the particular usage as a lens cover. It provides a simple means for closing off a passage through a tube. With the latching means of Figure 7, the closing may be partial or complete.

The closure unit 17 is a duplicate of the closure unit 18 just described. It is so mounted, however, that the finger piece 33 thereof is hidden from view in Figure 1 of the drawings, in order to be in the right place for engagement of the finger piece by the thumb of the trigger hand to release the closure unit 17 for opening.

When the tube 23 is twisted to close the tubular passage from the open end of the unit to the lens, the space between the tube 23 and the inner walls of the shell 27 and the band 24 is greatly increased in volume. I find it advisable to provide means for air to flow into and out of this space. An aperture 36 is formed in the band 24 for this purpose.

It is believed that the nature and advantages of my invention will be apparent from the foregoing description. My invention provides a simple, sure closing lens cover which seals off the lens area from outside air and foreign material. It provides a soft flexible interior wall leading to the lens from the open end to make it easy to keep the area clean and free of dust. It presents no metal parts to reflect light to interfere with sighting the rifle.

Having described my invention, I claim:

1. A lens cover comprising a sleeve member adapted for mounting on a tubular lens support, a flexible resilient tube having one end fixed to the sleeve member, a shell fixed to the other end of the flexible resilient tube and rotatably mounted on said sleeve member to rotate substantially on the axis of said sleeve member, for twisting the tube to close the passage through the shell and sleeve to the lens.

2. A device of the character described adapted to close the passageway to a lens from the open end of its tubular support, said device comprising a flexible resilient tube, a sleeve fixed to one end of said tube, a tubular shell into which the other end of said tube extends and is fixed thereto, means rotatably mounting the shell on said sleeve and coaxial therewith, the tube being twistable by rotating the shell relative to the sleeve to close said passageway, and latch means to secure the shell against reverse rotation to untwist the tube.

3. A device of the character described, comprising a cylindrical sleeve, a cylindrical shell, a flexible resilient tube extending through the shell and having its ends affixed to the shell and sleeve respectively, means rotatably mounting the shell on the sleeve to form a coaxial unit surrounding said tube, said means thereby allowing rotation of the shell relative to the sleeve to twist said tube and cause it to close.

4. The invention defined in claim 3 with latch means on the shell engaging a catch on said first named means to prevent untwisting the tube.

5. A device of the character described comprising a cylindrical band, a cylindrical shell journalled to rotate on said band and extending from one end thereof, a flexible resilient tube having one end affixed to the shell and extending through the joint by which the shell is journalled to the band, said tube having its other end affixed to the band, the tube being twistable to close the passage through the band by turning the shell on the band, and means on the shell and band to retain the shell and band in tube closing position against the pull of the tube tending to untwist.

6. The invention defined in claim 5 wherein the band has an air passage therethrough between the fixed ends of said tube.

7. A lens cover for the lenses of telescope sights and the like comprising a flexible resilient tube having an inner cross sectional opening comparable to the lens size, means to mount one end of the tube on the telescope end whereby the lens is exposed through the tube, a tubular shell around the tube to which the other end of the tube is affixed, means rotatably mounting the shell on the telescope end whereby the shell may be rotated to twist the tube and close passage through the tube to the lens, and manually releasable cooperating means affixed to the shell and the telescope end to hold the tube in passage closing position.

8. The invention defined in claim 7 wherein the means rotatably mounting the shell on the telescope end comprises a band enclosing the tube.

9. The invention defined in claim 7 wherein the means rotatably mounting the shell on the telescope end comprises a band enclosing the tube, said band having an airhole therethrough to the exterior of the tube.

References Cited in the file of this patent

UNITED STATES PATENTS 1,431,918   Arthur _____ Oct. 17, 1922